Sept. 18, 1962    N. L. RUMPP ETAL    3,054,353
SEGMENT GRAIN

Filed Sept. 23, 1958    2 Sheets-Sheet 1

INVENTORS.
N. L. RUMPP
C. A. GLASS
PAUL K. CHUNG

Sept. 18, 1962 N. L. RUMPP ETAL 3,054,353
SEGMENT GRAIN

Filed Sept. 23, 1958 2 Sheets-Sheet 2

INVENTORS.
N. L. RUMPP
C. A. GLASS
PAUL K. CHUNG

3,054,353
SEGMENT GRAIN

Norman L. Rumpp, Cecil A. Glass, and Paul K. Chung, China Lake, Calif., assignors to the United States of America as represented by the Secretary of the Navy
Filed Sept. 23, 1958, Ser. No. 762,895
3 Claims. (Cl. 102—98)
(Granted under Title 35, U.S. Code (1952), sec. 266)

The invention described herein may be manufactured and used by or for the Government of the United States of America for governmental purposes without the payment of any royalties thereon or therefor.

This invention relates to a method for making large diameter propellent grains, and the grain produced thereby.

In the past, propellent grains have been made by various methods, including casting and extrusion techniques. A disadvantage of the extrusion process is that large diameter grains cannot be produced which are strong enough to withstand handling and stresses under operating conditions without cracking. A disadvantage of the casting technique is that it requires expensive and elaborate apparatus and requires long curing times. A further disadvantage of both methods is the fact that if large cracks or deformations are found in the grain upon testing, the entire grain must be discarded.

It is therefore an object of this invention to provide a method for making large diameter propellent grains.

It is another object of this invention to provide a method as stated which produces a grain free of cracks and sufficiently elastic to withstand stresses resulting from temperature changes during storage.

It is a further object of this invention to provide a method for making large diameter propellent grains in which the necessity for discarding an entire grain because of deformities is eliminated.

Briefly, the invention comprises the fabrication of properly designed segments of propellent grains and assembling them into a composite grain of the desired shape in a permanent manner. An important feature of the invention includes the use of an elastic adhesive material to seal the mating surfaces.

Figure 1:
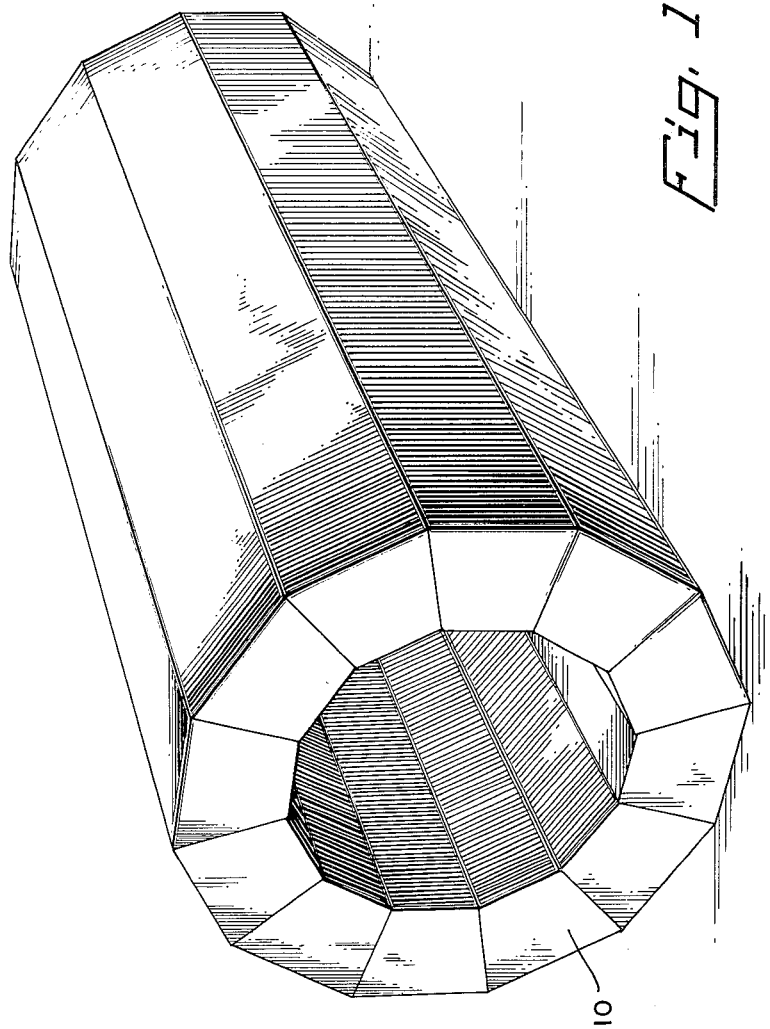
Figure 2:
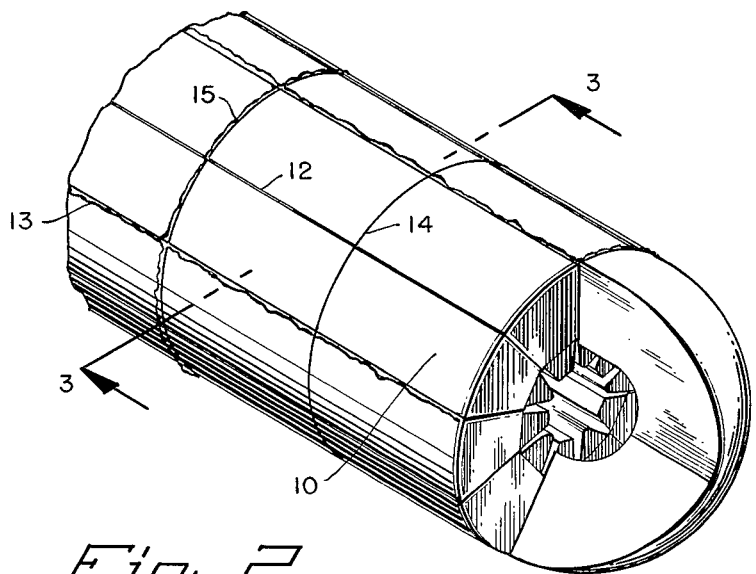
Figure 3:
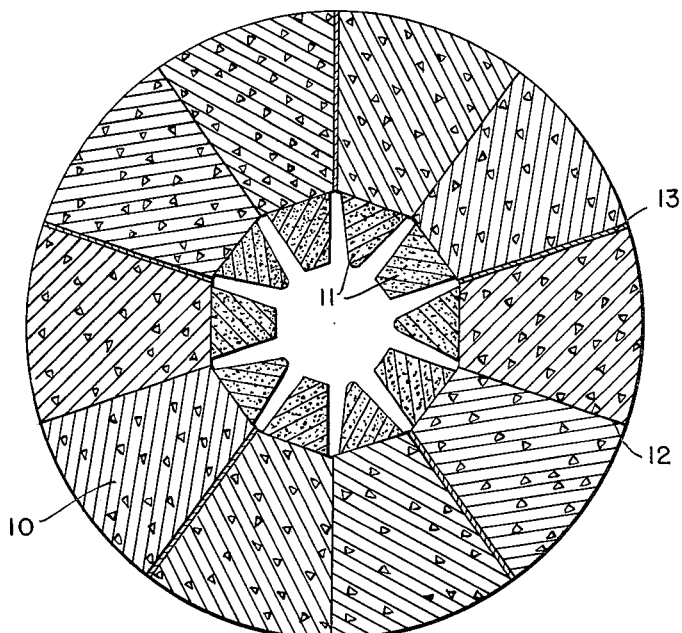

The invention is best understood by reference to the accompanying drawings and description, all of which are hereby made a part of this specification, and in which FIG. 1 is a perspective view of a longitudinal section of the finished propellent grain;

FIG. 2 is a perspective view of a propellent grain of the invention partly in section; and FIG. 3 is a cross-sectional view of the grain taken on the line 3—3 of FIG. 2.

In the figures, like parts are represented by like numerals. Referring to FIG. 1, the segments 10 are cast in the shape shown and machined to dimensions within the required tolerances. The particular configuration of FIG. 2 represents a propellent grain having a star-shaped internal burning surface. The segments 11 for forming the internal star-shaped surface and segments 10 are cast or extruded to approximate size and machined to within the required tolerances. The segments are tested by nondestructive methods and any defective ones discarded. The mating surfaces of the segments are then coated with an adhesive material, assembled around a star-shaped mandril and the assembly placed in a press. The grains are tightly compressed, the adhesive allowed to cure, if necessary, and the completed grain removed from the press for storage or use.

A suitable adhesive is one known in the art as ELBA which comprises about 60% by weight of ethyl lactate and 40% by weight of butyl acetate. This material in effect dissolves a small amount of the surface of the grain and fuses the mating parts together. A highly effective adhesive used to form the elastic joints in this invention is a silicone compound fully described in U.S. Patent No. 2,736,721. This adhesive is composed of (a) a solvent of aliphatic hydrocarbons, aromatic petroleum derivatives, or halogenated hydrocarbons, such as, n-heptane, benzene or ethylene dichloride, (b) a silicone resin copolymer of $R_3SiO_{1/2}$ and $SiO_2$ where R is an alkyl radical of less than 4 carbon atoms or a phenyl radical, and where the ratio of $R_3SiO_{1/2}$ units to $SiO_2$ units is between 0.6 to 0.9, inclusive, and (c) a diorganosiloxane having the general formula

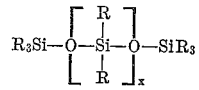

where R is methyl or phenyl and $x$ is such a number that will give this compound a viscosity of at least 1,000,000 cs. at 25° C. In each of the ingredients (b) and (c), at least 90% of the total number of R radicals are alkyl. In effect a more stable compound is obtained if the R radicals are 100% methyl.

The resin copolymer (b) can be a two component copolymer composed essentially of $SiO_2$ and $R_3SiO_{1/2}$ units in thte above-defined ratio. Resin (b) may also contain a limited amount of $R_2SiO$ units. In this event the total amount of $R_3SiO_{1/2}$ units plus $R_2SiO$ units is from 0.6 to 0.9, inclusive. The diorganosiloxane units may be present in resin (b) in an amount up to 0.2 per $SiO_2$ unit.

A preferred adhesive mixture is one containing 50% by weight each of (b) and (c) above, all of the R radicals being methyl. 35% by weight of this mixture is added to 65% by weight of xylene or n-heptane as solvent. Cotton cloth is dipped into the solution and the adhesive strip formed used to seal segments of the propellent grain together. Glass cloth or equivalent material may be used in place of cotton bunting.

A preferred procedure is to coat one of the mating surfaces of a segment with the silicon resin-impregnated cotton bunting and the other side with ELBA so that when the segments are assembled into a composite grain, the grains will be fastened together at their alternate edges by ELBA as indicated at 12 and by a silicone resin as indicated at 13 in FIGURES 2 and 3. The alternate ends of the central segments are sealed with ELBA and silicon resin as shown at 14 and 15, respectively, in FIGURE 2. The silicone adhesive when applied to the cotton provides a pressure sensitive flexible joint, the adhesive itself being pressure sensitive so that elasticity is provided. This provides for expansion and contraction of the grain segments in response to large changes in temperature so that cracking and formation of deformities in the propellant is prevented.

Propellant grains up to 21 inches in diameter have been made by the above described process. Large diameter grains were made using N–4, N–5 and high energy X–12 propellants. These are nitrocellulose-nitroglycerin double-base propellants. The adhesives used are compatible with the propellant compositions and have no undesirable effect on their ballistic properties. Propellant grains made by the above described process can be stored for long periods of time and subjected to wide variations in temperature without harmful effects. A representative composition of N–4 propellant is as follows:

| | Wt. percent |
|---|---|
| Nitrocellulose | 51.5 |
| Nitroglycerin | 33.5 |
| Diethylphthalate | 10.9 |
| 2-nitrodiphenylamine | 2.0 |

| | Wt. percent |
|---|---|
| Lead stearate | 0.5 |
| Potassium sulfate | 1.5 |
| Carbon black | 0.1 |

N-5 propellant is represented by the following percentage composition:

| | Wt. percent |
|---|---|
| Nitrocellulose | 44–53 |
| Nitroglycerin | 32–47 |
| Diethylphthalate | 3–11 |
| 2-nitrodiphenylamine | 1.5–2.5 |
| Lead salicylate | 1–3.5 |
| Lead 2,4-dihydroxybenzoate | 1–3.5 |

X-12 propellant is represented by the following percentage composition:

| | Wt. percent |
|---|---|
| Nitrocellulose | 40–65 |
| Nitroglycerin | 20–45 |
| Inert plasticizer | 0–20 |
| Stabilizer | .3–8 |
| Cupric salicylate | .1–10 |

A chief advantage of the invention is the fact that it produces a strong large diameter grain free of cracks and fissures which would cause aberations in burning. In the manufacture of large diameter grains either by extrusion or by casting, when cracks or deformities are found in or by casting, when cracks or deformities are found in the grain upon inspection it becomes necessary to discard the entire grain, resulting in a loss of large amounts of propellant. When constructing large diameter grains according to the present method it is necessary to discard only the defective segments rather than the completed grain.

While the invention has been illustrated by the use of specific propellants and adhesives which are peculiarly compatible, it is not so limited as the invention in its broadest sense encompasses a propellant grain of any material in which the individual segments have been adhered together by elastic material.

Obviously many modifications and variations of the present invention are possible in the light of the above teachings. It is therefore to be understood that within the scope of the appended claims the invention may be practiced otherwise than as specifically described.

What is claimed is:

1. A relatively long, large diameter nitrocellulose-nitroglycerin propellant grain comprising a plurality of individual longitudinal segments, each segment having two opposite lateral mating surfaces, said mating surfaces of said segments being secured to each other with an elastic adhesive material; said material consisting of (1) an aliphatic hydrocarbon solvent from the class consisting of N-heptane, benzene and ethylene dichloride, (2) a silicone resin copolymer of $R_3SiO_{1/2}$ and $SiO_2$ where R is selected from the group consisting of alkyl radicals of less than 4 carbon atoms and phenyl, and where the ratio of $R_3SiO_{1/2}$ units to $SiO_2$ units is between 0.6 to 0.9, inclusive, and (3) a diorganosiloxane having the general formula of

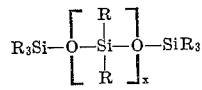

where R is a monovalent hydrocarbon radical selected from the group consisting of methyl and phenyl and $x$ is a number that will give this compound a viscosity of at least 1,000,000 centistokes at 25° C.

2. A relatively long, large diameter propellant grain comprising a plurality of individual longitudinal segments of propellant, each segment having two opposite lateral mating surfaces and end mating surfaces, alternate pairs of lateral mating surfaces and alternate pairs of end mating surfaces being adhered together by an elastic adhesive material consisting of (1) an aliphatic hydrocarbon solvent from the class consisting of N-heptane, benzene and ethylene dichloride, (2) a silicone resin copolymer of $R_3SiO_{1/2}$ and $SiO_2$ where R is a monovalent hydrocarbon selected from the group consisting of alkyl radicals of less than 4 carbon atoms and phenyl, and where the ratio of $R_3SiO_{1/2}$ units to $SiO_2$ units is between 0.6 to 0.9, inclusive, and (3) a diorganosiloxane having the general formula of

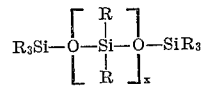

where R is a radical selected from the group consisting of methyl and phenyl and $x$ is a number that will give this compound a viscosity of at least 1,000,000 centistokes at 25° C.; the remaining surfaces being fused together by an adhesive consisting of a mixture of ethyl lactate and butyl acetate in a 60–40 weight percent ratio, respectively.

3. An article of manufacture consisting of a relatively long, large diameter nitrocellulose-nitroglycerin propellant grain with an internal star-shaped burning surface, comprising a first set of individual longitudinal segments, each segment having two opposite lateral mating surfaces, two end mating surfaces, an external and an internal surface, alternate pairs of lateral mating surfaces and the mating surfaces of alternate end surfaces being secured together by elastic adhesive material consisting of (1) an aliphatic hydrocarbon solvent from the class consisting of N-heptane, benzene and ethylene dichloride, (2) a silicone resin copolymer of $R_3SiO_{1/2}$ and $SiO_2$ where R is a monovalent hydrocarbon selected from the group consisting of alkyl radicals of less than 4 carbon atoms and phenyl, and where the ratio of $R_3SiO_{1/2}$ units to $SiO_2$ units is between 0.6 to 0.9, inclusive, and (3) a diorganosiloxane having the general formula of

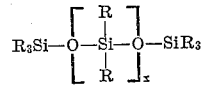

where R is selected from the group consisting of methyl and phenyl and $x$ is a number that will give this compound a viscosity of at least 1,000,000 centistokes at 25° C. and the remaining lateral surfaces and end surfaces being fused together by an adhesive consisting of a mixture of ethyl lactate and butyl acetate in a 60–40 weight percent ratio, respectively; and a second set of individual longitudinal grain segments each having end mating surfaces and an external surface, said external surfaces being fused by an adhesive consisting of a mixture of ethyl lactate and butyl acetate in a 60–40 weight percent ratio, respectively to the internal surfaces of the first mentioned longitudinal grain segments, the two remaining lateral surfaces and internal surface of said second set of segments forming the star-shaped internal burning surface of said grain; and said end mating surfaces being fused to each other by said last-mentioned adhesive.

References Cited in the file of this patent

UNITED STATES PATENTS

| 677,527 | Maxim | July 2, 1901 |
| 726,901 | Gathmann | May 5, 1903 |
| 1,074,809 | Newton | Oct. 7, 1913 |
| 1,920,075 | Haenichen | July 25, 1933 |
| 2,643,611 | Ball | June 30, 1953 |
| 2,816,418 | Loedding | Dec. 17, 1957 |
| 2,851,918 | MacLeod | Sept. 16, 1958 |
| 2,857,258 | Thomas | Oct. 21, 1958 |
| 2,863,353 | Brimley | Dec. 9, 1958 |